(12) United States Patent
Vaganov

(10) Patent No.: US 9,440,484 B2
(45) Date of Patent: *Sep. 13, 2016

(54) 3D DIGITAL PAINTING

(71) Applicant: Vladimir Vaganov, Los Gatos, CA (US)

(72) Inventor: Vladimir Vaganov, Los Gatos, CA (US)

( * ) Notice: Subject to any disclaimer, the term of this patent is extended or adjusted under 35 U.S.C. 154(b) by 277 days.

This patent is subject to a terminal disclaimer.

(21) Appl. No.: 14/306,090

(22) Filed: Jun. 16, 2014

(65) Prior Publication Data

US 2014/0292749 A1 Oct. 2, 2014

Related U.S. Application Data

(63) Continuation-in-part of application No. 13/116,015, filed on May 26, 2011, now Pat. No. 8,817,017.

(60) Provisional application No. 61/396,649, filed on Jun. 1, 2010.

(51) Int. Cl.

| | |
|---|---|
| *B44D 2/00* | (2006.01) |
| *B44F 7/00* | (2006.01) |
| *G06F 3/0481* | (2013.01) |
| *H04N 13/04* | (2006.01) |
| *G06F 3/0354* | (2013.01) |
| *H04N 13/02* | (2006.01) |
| *H04N 13/00* | (2006.01) |

(52) U.S. Cl.
CPC .............. *B44D 2/002* (2013.01); *B44F 7/00* (2013.01); *G06F 3/03545* (2013.01); *G06F 3/04815* (2013.01); *H04N 13/02* (2013.01); *H04N 13/04* (2013.01); *H04N 13/0022* (2013.01); *H04N 13/0296* (2013.01); *H04N 13/0404* (2013.01); *H04N 13/0409* (2013.01); *H04N 13/0434* (2013.01); *H04N 13/0438* (2013.01)

(58) Field of Classification Search
None
See application file for complete search history.

(56) References Cited

U.S. PATENT DOCUMENTS

| | | |
|---|---|---|
| 3,737,567 A | 6/1973 | Kratomi |
| 4,021,846 A | 5/1977 | Roese |
| 5,379,369 A | 1/1995 | Komma |
| 5,613,048 A | 3/1997 | Chen |
| 5,953,014 A | 9/1999 | Wood |
| 6,850,210 B1 | 2/2005 | Lipton |

(Continued)

OTHER PUBLICATIONS

Adams, Bart, et al.; "Interactive 3D Painting on Point-Sampled Objects"; Proceedings of the First Eurographics Conference on Point-Based Graphics; Eurographics Association, 2004.

(Continued)

*Primary Examiner* — Zhengxi Liu
(74) *Attorney, Agent, or Firm* — Fitch, Even, Tabin & Flannery LLP

(57) ABSTRACT

A method of digital continuous and simultaneous three-dimensional painting and three-dimensional drawing with steps of providing a digital electronic canvas having a screen and capable of presenting two pictures for a right eye and a left eye; providing means for continuous changing of a virtual distance between the digital electronic canvas and a painter by digitally changing a horizontal shifting between images for the right eye and the left eye on the digital electronic canvas corresponding to instant virtual canvas position; providing at least one three-axis input control device allowing digital painting or drawing on the digital electronic canvas; painting on the digital electronic canvas for any instant virtual positions of the digital electronic canvas providing simultaneous appearance of a similar stroke on the images for the right eye and the left eye.

20 Claims, 17 Drawing Sheets

(56) References Cited

U.S. PATENT DOCUMENTS

| | | |
|---|---|---|
| 6,943,852 B2 | 9/2005 | Divelbiss |
| 7,126,598 B2 | 10/2006 | Oh |
| 2003/0142068 A1 | 7/2003 | DeLuca |
| 2006/0061545 A1 | 3/2006 | Hughes |
| 2008/0129899 A1 | 6/2008 | Sharp |
| 2011/0157155 A1 | 6/2011 | Turner |
| 2011/0292042 A1 | 12/2011 | Vaganov |
| 2013/0278631 A1 | 10/2013 | Border |
| 2013/0283208 A1 | 10/2013 | Bychkov |

OTHER PUBLICATIONS

Dorsey, Julie, et al.; "The Mental Canvas: A Tool for Conceptual Architectural Design and Analysis"; Computer Graphics and Applications, 2007, PG'07; 15th Pacific Conference on IEEE, 2007.

Gregory, Arthur D., Stephen A Ehmann, and Ming C. Lin; "InTouch: Interactive Multiresolution Modeling and 3D Painting with a Haptic Interface"; Virtual Reality, 2000; IEEE, 2000.

Non-final office action from U.S. Appl. No. 13/116,015 mailed Nov. 5, 2013.

Notice of Allowance from U.S. Appl. No. 13/116,015 mailed Mar. 14, 2014.

Olsen, Luke, et al.; "Sketch-based modeling: A Survery"; Computers & Graphics 33.1; 2009; 85-103.

Ryan, Michael; "3D Scuplting Using Voxels with an exploration into interfaces"; 2005.

Vaganov; U.S. Appl. No. 13/116,015, filed May 26, 2011.

Xin, Min, Ehud Sharlin, and Mario Costa Sousa; "Napkin Sketch: Handheld Mixed Reality 3D Sketching"; Proceedings of the 2008 ACM Symposium on Virtual Reality Software and Technology; ACM, 2008.

PCT; International Search Report and Written Opinion of the International Searching Authority correspodning to International Patent Application No. PCT/US2015/035811 mailed Sep. 3, 2015; 13 pages.

providing a digital electronic canvas capable to presenting
two pictures for the right and left eye providing means for changing the virtual distance
between the canvas and the painter by digital changing
the horizontal shifting between the images
for the right and left eye on the canvas
corresponding to each virtual canvas position painting on the electronic canvas for each virtual
positions of the canvas providing simultaneous
appearance of a similar stroke on the right and left image
due to a high spatial and/or time resolution
between right and left image on the canvas

Fig. 1

3D DIGITAL PAINTING

CROSS-REFERENCE TO RELATED APPLICATIONS

This application is a continuation-in-part of U.S. application Ser. No. 13/116,015, filed May 26, 2011, for 3D DIGITAL PAINTING, which claims the benefit of U.S. Provisional Application No. 61/396,649, filed Jun. 1, 2010, for 3D DIGITAL PAINTING, which are incorporated in their entirety herein by reference.

FIELD OF THE INVENTION

This invention relates to digital painting and drawing of three-dimensional images, that can be viewed and presented with different types of stereo vision. The present invention in various embodiments creates a new art of three-dimensional painting, provides a powerful tool in education from childhood education to university graduate education and further, provides a tool for science and engineering, in design of mechanical models and in chemical and biological research and the like. In general, the technology of the present invention, in various embodiments, can be used for consumer, educational, professional, environmental, military and other applications.

BACKGROUND

There is a need for improved mechanisms for digital drawing, painting and writing technologies. The information contained in a graphical or painted image (color or monochromatic) cannot be explained, interpreted or communicated by other means, for example by voice, for inputting digital information into a computer nearly as effectively as with the graphical or painted image.

However, until now all painting art is two-dimensional due to the two-dimensional nature of all known canvases (more precisely, drawing surface, even if it is not a plane but, for example, a cylindrical, spherical or other curved surface). One of the challenges of painting always was how to create an image of the third dimension, the illusion of depth of a picture. Although a number of great painters achieved fantastic results in this endeavor, nevertheless the interest in three-dimensional visual images resulted in art forms such as sculpture and architecture. However, painted sculptures didn't receive wide acceptance. Then, realization of three-dimensional or stereo vision, with the advent of photography, when two photo-cameras, spaced at a distance of about the distance between the human eyes, made two pictures. These pictures are viewed through the stereoscope, which was invented in 1838.

Progress in stereo photography (both stereo photographs and stereo motion pictures) has been made over the last 170 years. The most recent improvements in three-dimensional movies and three-dimensional TV are making an interest in these technologies even greater, as they become available in consumer products.

However, there remains a need for improvements in three-dimensional painting mostly because nothing changed in dimensionality of the two-dimensional canvas for painting.

There are several challenges to solving the problem of three-dimensional free-hand painting and drawing. The first challenge is a three-dimensional canvas for a free-hand painting and drawing on or within this canvas.

It is hard to imagine, from an existing technology viewpoint, a kind of media suitable for a true three-dimensional (cube) canvas, transparent and allowing for penetration into the cube with a brush, making a stroke of paint, and removing the brush without disturbing the rest of the media (i.e., drawing or painting). It sounds like science fiction, at least from the viewpoint of existing technology and known materials other than painted sculptures, requiring making of a sculpture, and then painting of such sculpture.

As known, depth perception, as visual ability to perceive the world in three dimensions (three-dimensional), arises from a variety of depth cues. From all the depth cues both monocular and binocular stereopsis found the most practical applications. Stereopsis is the process in visual perception leading to the sensation of depth from the two slightly different projections of the world onto the retinas of the two eyes. The differences in the two retinal images are called horizontal disparity, retinal disparity, or binocular disparity. The differences arise from the eyes' different positions in the head.

These two images corresponding to different visions of the right and left eyes are relatively easy to create by stereo-photography or stereo-movie by taking two pictures simultaneously with two cameras separated horizontally similar to two separated eyes. However, it is hard to imagine how an artist can paint two paintings of the same image on two different canvases for two eyes such that they later could be viewed with one of the stereoscopic viewing systems.

As long as art of painting exists, almost all artists have been trying to perfect techniques for a three-dimensional illusion on a two-dimensional canvas, demonstrating the long-felt need for a three-dimensional painting technique. Therefore, there is a need for creating a method and system for three-dimensional painting and drawing.

SUMMARY

A method of digital recording of three-dimensional painted and three-dimensional drawn images is presented. The method comprises the steps of: providing an electronic canvas (computer monitor, TV screen, projection screen, display of the mobile device, etc.); providing means for three-dimensional digital vision (shutter glasses, switching canvas between left and right eye, polaroid glasses, vertical cylinder lenses raster screens, etc.); providing at least one at least two-axis input control devices allowing digital painting or drawing on the canvas; providing additional at least one at least one-axis input control device for virtual changing the position of the canvas along the axis between the painter and the canvas; painting or drawing on the electronic canvas for each of the virtual positions of the canvas in the third dimension by changing this position with the at least one at least one-axis input control device and verifying this position with the means for three-dimensional digital vision; providing a description in digital format of images for right and left eyes on each virtual position of the canvas and of corresponding positions of the canvas; providing complete two-dimensional images of the painting for the right and the left eyes; using left and right images for presentation of three-dimensional painting by available means for three-dimensional vision.

A corresponding system for digital recording of three-dimensional painted and three-dimensional drawn images is also presented. The system comprises: an electronic canvas (computer monitor, TV screen, projection screen, display of the mobile device, etc.); means for three-dimensional digital vision (shutter glasses, switching canvas between left and right eye, etc.); at least one at least two-axis input control device allowing digital painting or drawing on the canvas; at least one at least one-axis input control device for virtual changing the position of the canvas along the axis between the painter and the canvas; means for three-dimensional image presentation; wherein the system provides painting or drawing on the electronic canvas for each of the virtual positions of the canvas in the third dimension by changing this position with the at least one-axis input control device and verifying this position with the means for three-dimensional digital vision; the system also provides a description in digital format of images for right and left eyes on each virtual position of the canvas and of corresponding positions of the canvas; the system also provides complete two-dimensional images of the painting for the right and the left eyes; the system provides using left and right images for presentation of three-dimensional painting by available means for three-dimensional vision.

BRIEF DESCRIPTION OF DRAWINGS

FIG. 1 shows a core principle of the method of three-dimensional digital painting in accordance with one embodiment.

DETAILED DESCRIPTION

Figure 2:
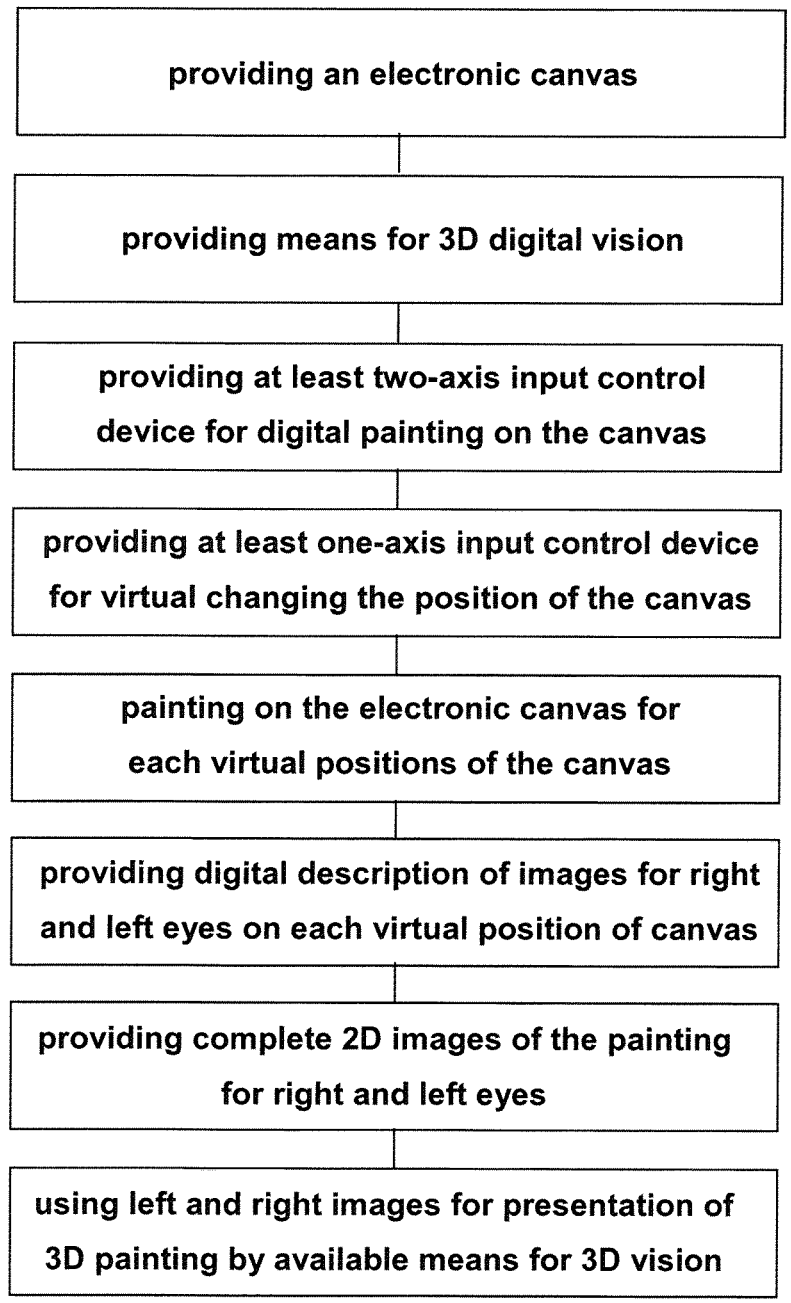
FIG. 2 shows an algorithm of the method for digital recording of three-dimensional painted and three-dimensional drawn images in accordance with a further embodiment.

Specific embodiments of the invention will now be described in detail with reference to the accompanying figures.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Objects and Advantages

A feature of the present invention in accordance with some embodiments is to provide a method of 3-dimensional digital painting.

Another feature of the present invention in accordance with some embodiments is to provide a method of 3-dimensional digital drawing.

Another feature of the present invention in accordance with some embodiments is to provide a method of 3-dimensional digital writing.

Another feature of the present invention in accordance with some embodiments is to provide a method of 3-dimensional digital navigation of the cursor on the monitor.

Another feature of the present invention in accordance with some embodiments is to provide a method of handless 3-dimensional digital painting, drawing, writing and navigating of the cursor on the monitor.

Another feature of the present invention in accordance with some embodiments is to provide a method of 3-dimensional digital navigating of the objects in three-dimensional computer and mobile gaming.

Another feature of the present invention in accordance with some embodiments is to provide a method of 3-dimensional digital editing of the three-dimensional photos (three-dimensional photoshop).

Another feature of the present invention in accordance with some embodiments is to provide a method of converting 2-dimensional images into 3-dimensional images.

Another feature of the present invention in accordance with some embodiments is to provide a method of digital recording of three-dimensional painted and three-dimensional drawn images.

Another feature of the present invention in accordance with some embodiments is to provide a method of 3-dimensional digital painting, drawing, writing and navigating simultaneously by multiple participants, that creates a new platform for three-dimensional communication, education, gaming, design, research and development and entertainment.

Another feature of the present invention in accordance with some embodiments is to provide a system for 3-dimensional digital painting.

Another feature of the present invention in accordance with some embodiments is to provide a system for 3-dimensional digital drawing.

Another feature of the present invention in accordance with some embodiments is to provide a system for 3-dimensional digital writing.

Another feature of the present invention in accordance with some embodiments is to provide a system for 3-dimensional digital navigation of the cursor on the monitor.

Another feature of the present invention in accordance with some embodiments is to provide a system for 3-dimensional digital navigating of the features in three-dimensional computer and mobile gaming.

Another feature of the present invention in accordance with some embodiments is to provide a system for handless 3-dimensional painting, drawing, writing and digital navigating of the features in three-dimensional computers and mobile devices.

Another feature of the present invention in accordance with some embodiments is to provide a system for 3-dimensional digital editing of the three-dimensional photos (three-dimensional photoshop).

Another feature of the present invention in accordance with some embodiments is to provide a system for converting 2-dimensional images into 3-dimensional images.

Another feature of the present invention in accordance with some embodiments is to provide a system for digital recording of three-dimensional painted and three-dimensional drawn images.

Another feature of the present invention in accordance with some embodiments is to provide a system for 3-dimensional digital painting, drawing, writing and navigating simultaneously by multiple participants, that creates a new platform for three-dimensional communication, education, gaming, design, research and development and entertainment.

Another feature of the present invention in accordance with some embodiments is to provide input control devices for digital three-dimensional painting, three-dimensional drawing, writing and navigating objects on the monitor of the computer or electronic portable devices.

Another feature of the present invention in accordance with some embodiments is to provide a universal tool, which can be used for multiple applications. It can be used as a painting or drawing tool, as a pen or pencil for writing, as a mouse or joystick for navigation on the screen or computer or mobile gaming, it can have a wireless capability and can be combined with cell-phone capabilities with all the attributes, which a smart phone has: display, camera, microphone, speakerphone, control buttons, etc.

Preferred Embodiments

Principles of the method of digital three-dimensional painting and three-dimensional drawing illustrated in FIG. 1 and can be described as follows:
providing a digital electronic canvas capable of presenting two pictures for the right and left eye;
providing means for changing the virtual distance between the canvas and the painter by digital changing the horizontal shifting between the images for the right and left eye on the canvas corresponding to each virtual canvas position;
painting on the electronic canvas for each virtual position of the canvas providing simultaneous appearance of a similar stroke on the right and left image due to a high spatial and/or time resolution between right and left image on the canvas.

Based on these principles a method of digital recording of three-dimensional painted and three-dimensional drawn images is illustrated in FIG. 2 and is represented by the following sequence of steps:
providing an electronic canvas (computer monitor, TV screen, projection screen, display of the mobile device, etc.);
providing means for three-dimensional digital vision (shutter glasses, splitting canvas on two canvases and switching these canvases between left and right eye, etc.);
providing at least one at least two-axis input control device allowing digital painting or drawing on the canvas;
providing additional at least one at least one-axis input control device for virtual changing the position of the canvas along the axis between the painter and the canvas;
painting or drawing on the electronic canvas for each of the virtual positions of the canvas in the third dimension by changing this position with the at least one-axis input control device and verifying this position with the means for three-dimensional digital vision;
providing a description in digital format of images for right and left eyes on each virtual position of the canvas and of corresponding positions of the canvas;
providing complete two-dimensional images of the painting for the right and the left eyes;
using left and right images for presentation of three-dimensional painting by available means for three-dimensional vision.

Figure 3:
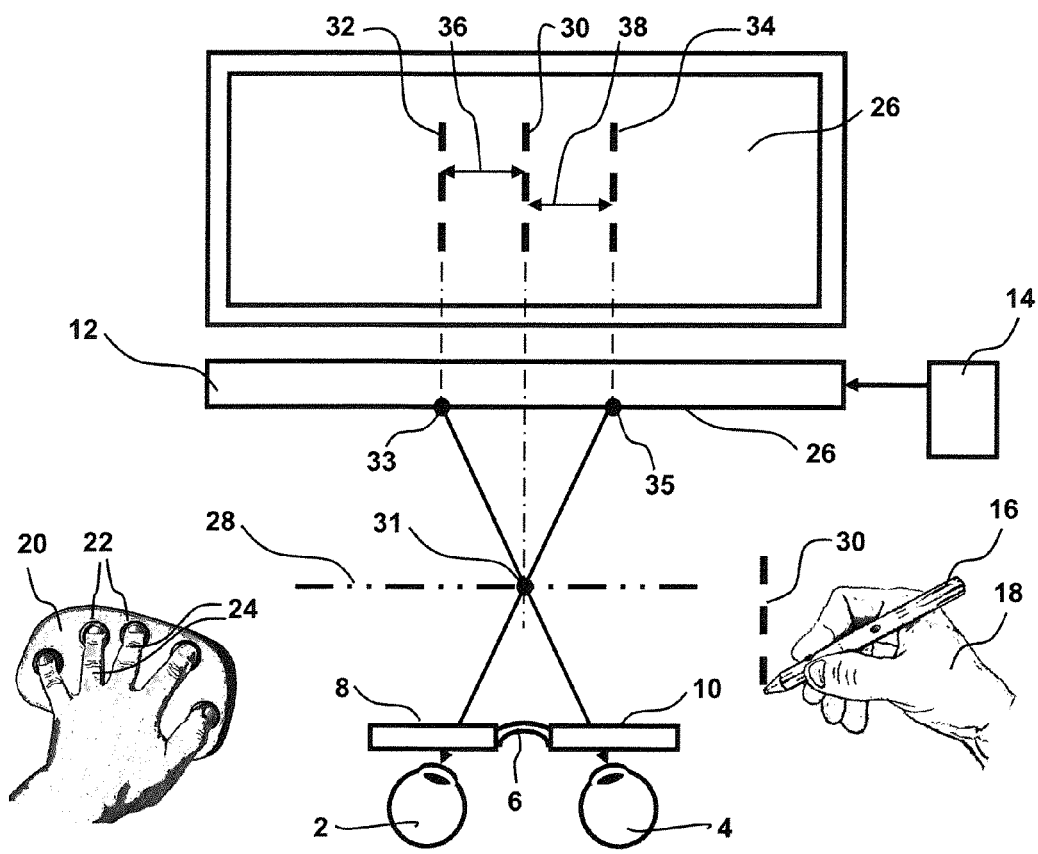
FIG. 3 shows a concept of three-dimensional digital painting on a virtual canvas located between painter and digital monitor in accordance with another embodiment.

This method and corresponding system for realization of this method are illustrated in FIG. 3. The system comprises an electronic canvas 26 (computer monitor, TV screen, projection screen, display of the mobile device, etc.) controlled by computer 14. Means for three-dimensional digital vision require two properties. First, it requires an ability of the screen 26 to represent two canvases for the right and left eye. It can be done either by switching the screen between canvases for the right and the left eye or by making two striped canvases, which overlap in a way when columns of pixels on the screen are located in turn belonging to two different canvases—right and left. The second property can be realized either by using shutter glasses 6 synchronized with the switching of the screen, or by using the raster of vertical miniature cylinder lenses on the front surface of the screen 26, or using the polarizing filter on the front surface of the screen, which would be capable of switching polarization of the screen light with some frequency between the right and left canvas. In later cases simple, light, low cost polarized glasses can be used without artifacts of shutter glasses.

The next key component of the system is a hand-held electronic pen or brush 16 allowing painting or drawing by hand 18 on the canvas 26. Obviously this brush/pen can be digital, wireless and provide many other functions useful for inputting information into digital processing systems. This tool should be at least two-axis input control device allowing digital painting or drawing on the canvas. However, increasing a number of axes gives many additional features. For example, using three-axis input control would allow to use it not only like a pen with constant width of the line but like a real brush, when a painter will be able to change the width of the line in the process of painting exactly how he is doing with the real brush. Moreover, additional controls on the tool might allow changing the color, transparency, structure of the stroke and many other characteristics of the painting process and resulting images.

Another important component of the system is an additional input control device for virtual changing the position of the canvas along the axis between the painter and the canvas. As shown in FIG. 3, it might be useful to have this device 20 controlled by the other than painting hand 18. Multiple control buttons/joysticks 22 can be used for different fingers 24 increasing the number of functions to be controlled. The control buttons/joysticks 22 can be one-axis, two axis or three-axis additionally increasing the number of controlled functions. If thumb and four fingers are used and each of the buttons/joysticks is a three-axis device then 15 control functions can be used simultaneously. For example, controlling functions of the digital painting process can be chosen from a group of: action, turning on and off, navigation of a cursor on the display of the electronic device, scrolling, zooming, shadowing, screening, selecting, deleting, restoring, saving, opening, closing, searching, setting up, previewing, undoing, clearing, repeating, pasting, finding, replacing, inserting, formatting, color selection, color mixing, line or stroke width, brush size, swatch size, sponge size, eraser size, the canvas virtual position, the depth of the focal plane around the canvas virtual position, special effects or combination.

This system provides painting or drawing on the electronic canvas for each of the virtual positions of the canvas in the third dimension by changing this position with the at least one-axis input control device and verifying this position with the means for three-dimensional digital vision. The system also provides a description in digital format of images for the right and the left eyes on each virtual position of the canvas and of corresponding positions of the canvas The system also provides complete two-dimensional images of the painting for the right and the left eyes by superposition of all layers corresponding to virtual positions of the canvas for the right and the left eye separately The system also provides complete three-dimensional images of the painting by superposition of all layers corresponding to all virtual positions of the canvas. The system provides using left and right images for presentation of three-dimensional painting by available means for three-dimensional vision.

As soon as the system will provide complete two-dimensional images of the painting for the right and the left eye, any available system for stereoscopic imaging can be used for presentation of three-dimensional paintings.

Figure 4:
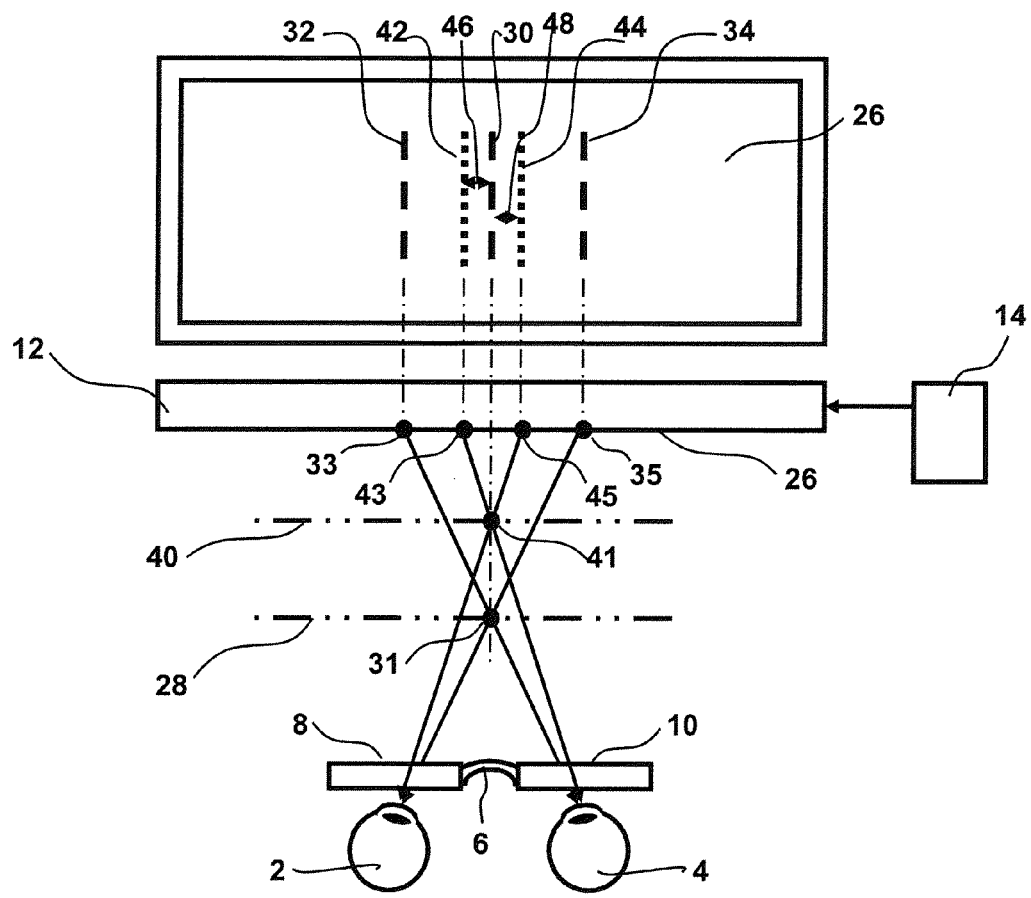
FIG. 4 illustrates how offsets (horizontal shifts creating binocular disparity) of the virtual canvases for the right and left eyes depend on the position of the virtual canvas.

The method of three-dimensional painting is also illustrated in FIG. 3. A painter is painting with an electronic brush 16, which he is moving by his hand 18 on any surface suitable for moving an electronic brush along this surface. Let us suppose that a painter is painting a vertical line 30 and he wants to paint it in the virtual position of the canvas 28 in location 31 corresponding to a central line between the eyes 2 and 4. This virtual plane 28 is located between the screen 26 and the painter. It means that both eyes should be focused on the point 31 to see that line in the desired position. It means, in turn, that the image of this line for the right eye should be located on the screen 26 in the position 33 and the image of this line for the left eye should be located on the screen 26 in the position 35. Then the painter will be seeing the line 30 outstanding from the screen plane 26 to the virtual canvas plane 28 in the position 31. For achieving this effect the control device 22 should provide the shift of the line 30 image for the right eye on a distance 36 into location 32 (33). For the left eye similar shift should be 38 in opposite direction into position 34 (35). In other words, the virtual position of the canvas is determined by the corresponding shifts of the right and left images in the opposite directions with respect to the central line on the screen, as illustrated in FIG. 4. It creates binocular disparity and visual sensation of depth.

Changing the shifts of the images for the right eye from 32 to 42 and for the left eye from 34 to 44 the virtual canvas position will change from plane 28 to plane 40, as it is clear from FIG. 4.

Figure 5:
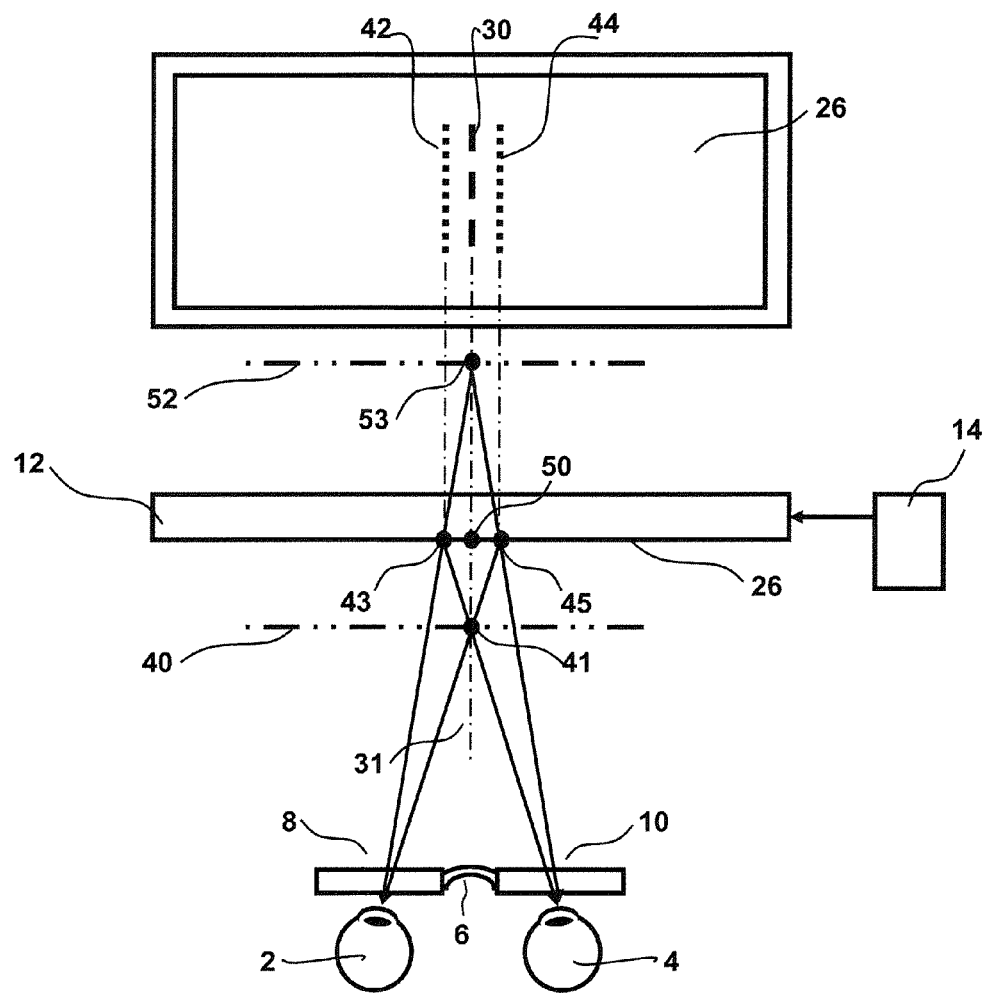
FIG. 5 illustrates how the offsets (horizontal shifts) of the virtual canvases for the right and left eyes change sign, when virtual canvas changes position from in front of the plane of a display to behind the plane of a display.

FIG. 5 illustrates how the virtual position of the canvas could be located either in front of the screen or behind the plane of the screen. If the line 42 (43) on the screen 26 is allocated to the virtual screen for the right eye 4 and the line 44 (45) on the screen 26 is allocated to the virtual screen for the left eye 2, then the location of the virtual screen corresponds to plane 40. The image of the line 30 (50) will be located in the position 41 on the virtual plane 40, which is located between the screen 26 and the painter.

Let us now change the allocations of the images 43 and 45 on the screen 26 between the right and left eyes. If the line 42 (43) on the screen 26 is allocated to the virtual screen for the left eye 2 and the line 44 (45) on the screen 26 is allocated to the virtual screen for the right eye 4, then the location of the virtual screen corresponds to plane 52. The image of the line 30 (50) will be located in the position 53 on the virtual plane 52, which is positioned behind the screen 26.

It is clear that when the image of the line 30 supposed to be located on the screen plane in the position 50, then there is no difference between the images for the right and the left eye, i.e. there is no shift between the images for the right and the left eye with respect to the center line 31 between the right and the left eye.

Figure 6:
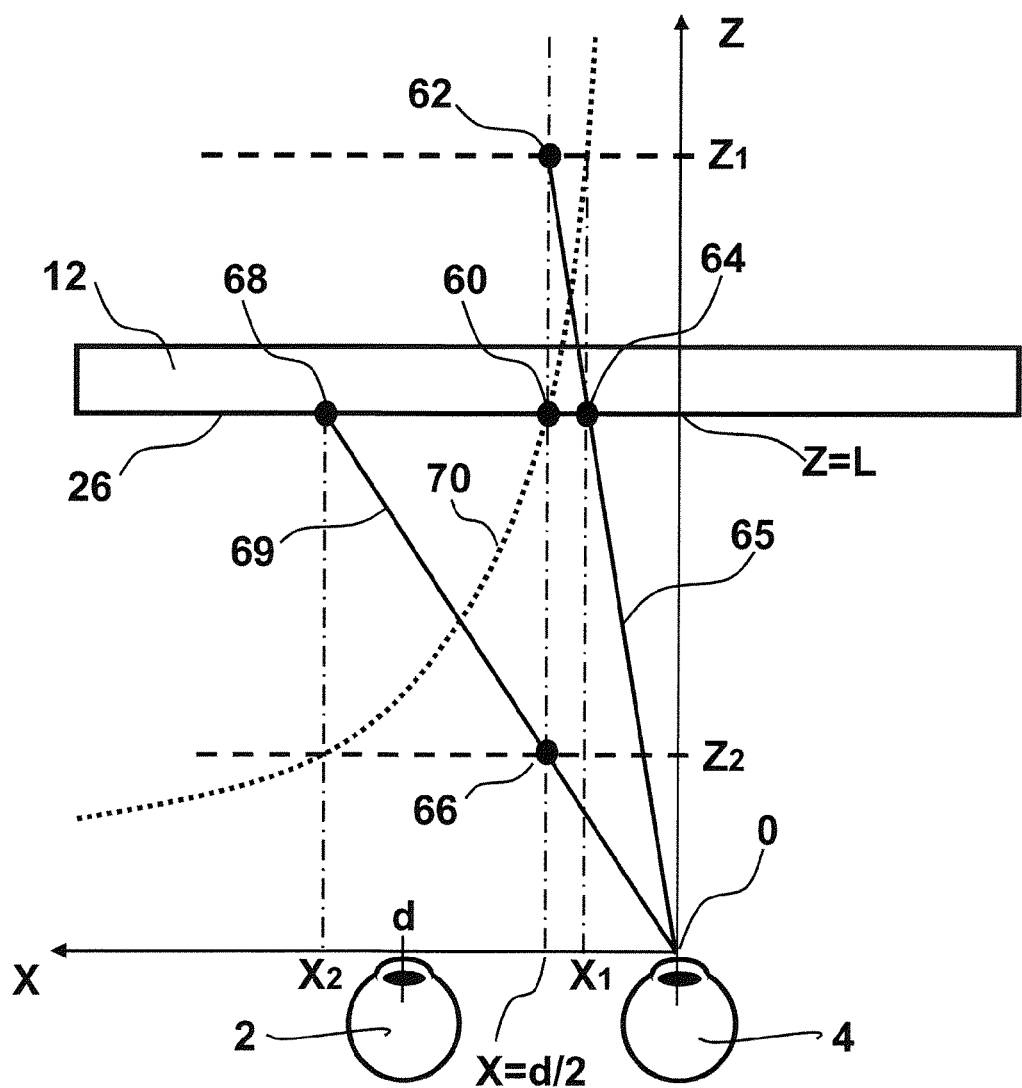
FIG. 6 illustrates the offset (horizontal shift) of the virtual canvas for the right eye as a function of the virtual canvas position.
Figure 7:
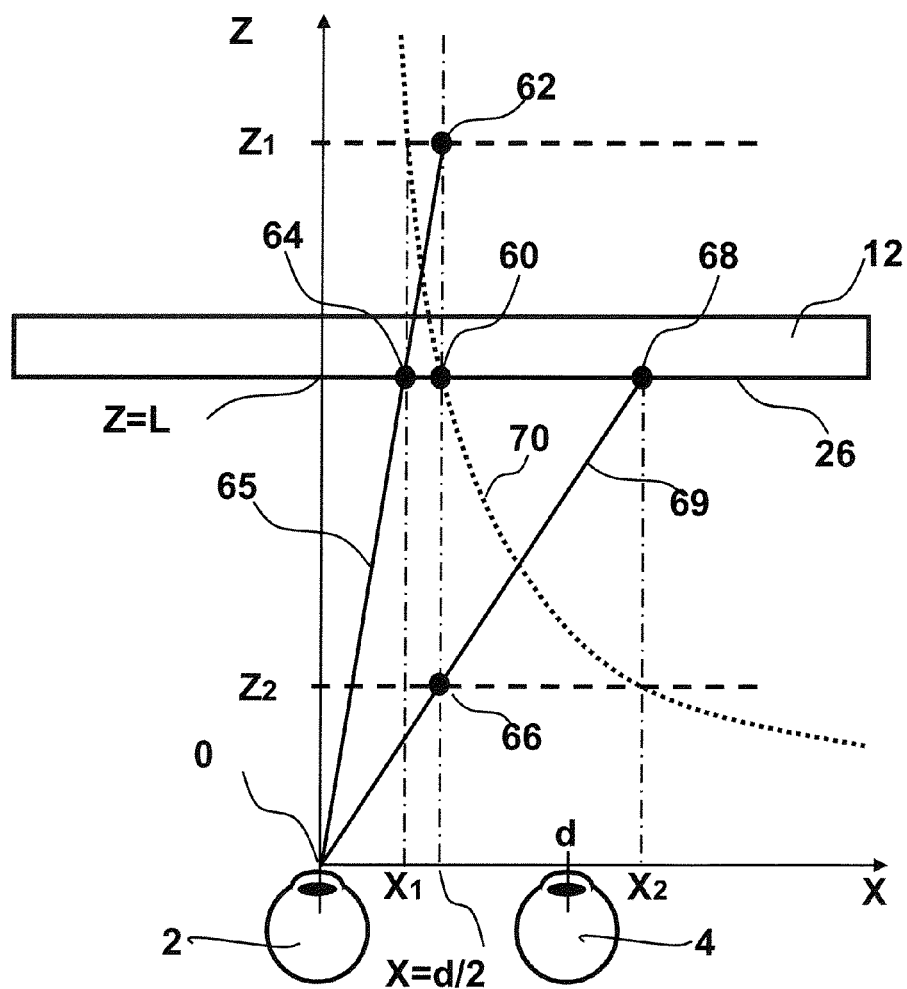
FIG. 7 illustrates the offset (horizontal shift) of the virtual canvas for a left eye as a function of the virtual canvas position.

FIG. 6 illustrates the function 70 between the desired location of the virtual canvas plane Z1 or Z2 and the image 64 or 68 correspondingly on the screen 26 for the right eye 4. Similarly FIG. 7 illustrates the same for the left eye. This function can be expressed as:

$$Z=Ld/2x,$$

where Z—location of the virtual canvas;
L—distance between painter and monitor;
  d—distance between eyes;
  x—location of the image on the screen.

Therefore, in order to move the virtual canvas into a coordinate Z on the axis Z, which originates in the painter eye and perpendicular to the screen, the control of this function should provide a horizontal shift x of the virtual canvas for this eye relative to the point on the screen where axis Z crosses the screen. This shift should be directed toward the other eye. As a result, two virtual canvases will exist in the painter's field of vision and due to their mutual shift in opposite directions the painter will see one virtual screen located either in front or behind the plane of the screen in the coordinate Z. This required shift x can be determined as:

$$x=Ld/2Z,$$

Figure 8:
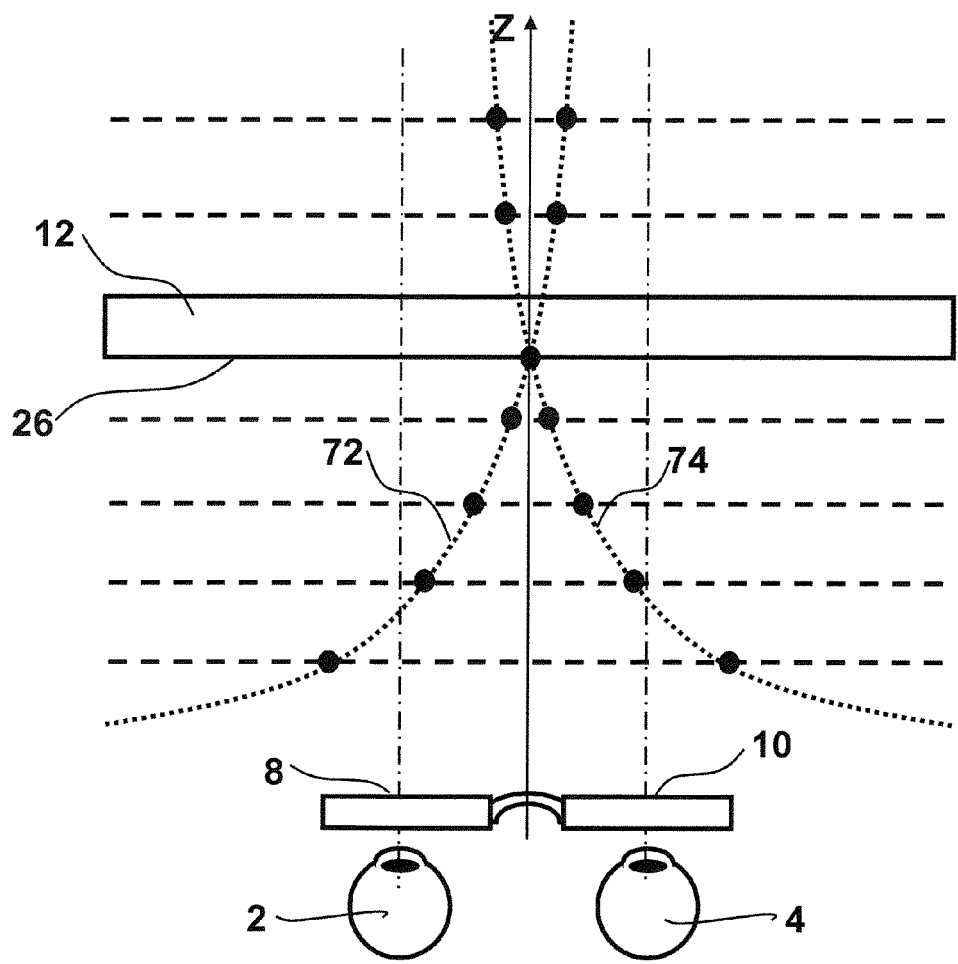
FIG. 8 illustrates how central vertical lines of the canvases for the right and left eyes change (offset) in opposite directions depending on the virtual position of the canvas.

FIG. 8 combines FIGS. 6 and 7 presenting both functions 72 and 74 for right and left eye correspondingly.

The challenge with determining the position of the initial canvas is that it is blank and the right and left eye cannot see the difference in their images. Similar situation will exist at the beginning stage of painting, when there are not too many images or the strokes of the electronic brush already exist on the canvas. Even at the later stages of painting or in case of editing three-dimensional pictures (three-dimensional photoshop) it would be very helpful to have temporary grid or system of lines, which would give a painter or observer the visual representation of the current position of the virtual canvas.

In the simplest case the virtual position of the canvas is presented by at least one virtual Z-axis having an origin somewhere in the plane parallel to the screen. It might be located at the location of a painter and directed from the painter plane toward the screen. It has a scale describing a distance from the painter to the virtual position of the canvas and this current virtual position of the canvas is indicated on the scale.

The origin of the virtual Z-axis can be located somewhere in the horizon line and indicate the position of the virtual canvas on the scale of the axis. In general one virtual Z-axis is presented on the screen as a line with the scale connecting some point on the periphery of the screen with some inner point within the screen. The pitch of the scale might be non-linear reflecting the changing distance of the object from the painter.

In more general cases virtual Z-axis can be presented by the line chosen from: straight line, curved line, periodic line, spiral line, vertical line, horizontal line, descending line, ascending line and combination.

Figure 9:
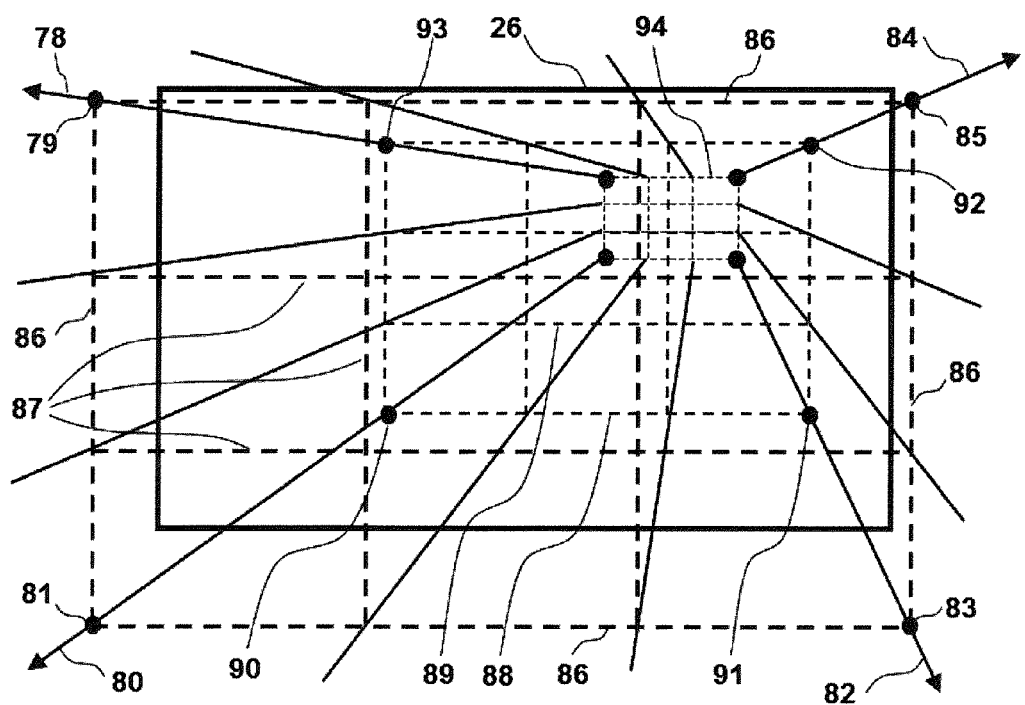
FIG. 9 illustrates virtual Z-axes and temporary grid indicating the position of virtual canvas.

It is more convenient to have several Z-axes, as shown in FIG. 9. In this case it is possible to show: the position of the virtual canvas; scaling of the similar objects depending on the position of the virtual canvas; either virtual infinite point—origin of all Z-axes or the most distant virtual position of the canvas, both of which can be selected by the painter. Four major Z-axes 78, 80, 82 and 84 along with several additional Z-axes define a three-dimensional grid, as show in FIG. 9. Corresponding points on the major Z-axes are connected by lines 86, 88, 94 creating a visual representation of the plane, which can correspond to a current position of the virtual canvas. The temporary grid visually defining the virtual position of the canvas is a system of lines including lines connecting points on different virtual Z-axes corresponding to the same position of the virtual canvas.

These rectangles 86, 88 and 94 can have additional inner lines 87, 89, which further provide scaling of two-dimensional images on each virtual position of the canvas. This two-dimensional scaling can be provided automatically while position of canvas is changing. The function of two-dimensional scaling of the canvas position can be chosen beforehand and it will determine the depth of the painting. The depth of the painting in Z dimension can be controlled depending on requirements to a three-dimensional painting. The Z-axes are perceived by the painter as lines going in Z direction from the painter toward some point behind the screen or in opposite direction because they are presented on both canvases for right and left eyes. Therefore, the entire grid is seen as a three-dimensional structure, within which the painting is happening.

There are a number of options that exist with choosing the location and position of the axes, their scales, and, as a result, virtual positions of the canvas. For example, at least one virtual Z-axis can have an angle relative to the perpendicular to the canvas in the range of 0 to 90 degrees. The scale on the at least one virtual Z-axis can be chosen as linear, exponential, logarithmic, sine, or any other function. The scale on different virtual Z-axes can be different reflecting the different angular position of the virtual canvas with respect to different virtual Z-axes.

Figure 10:
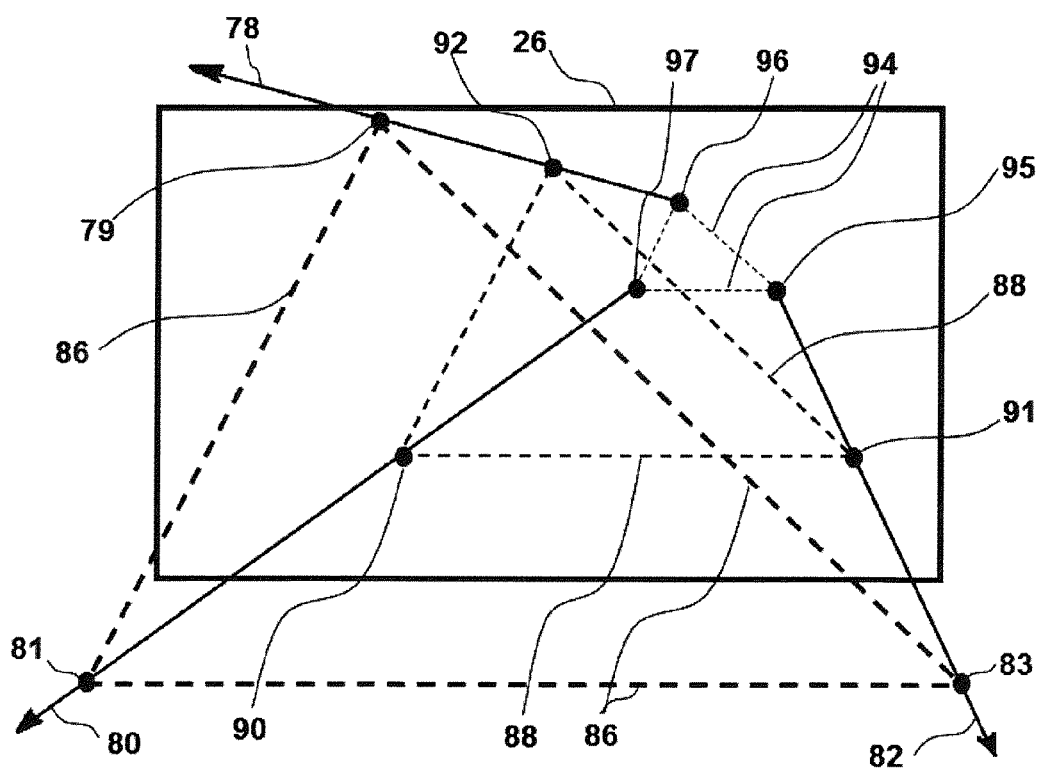
FIG. 10 illustrates a case of only three virtual Z-axes and temporary triangle grid indicating the position of virtual canvas.

The number of Z-axes can be different. FIG. 10 illustrates the case of three Z-axes and corresponding triangle pyramidal three-dimensional grid for controlling the position of virtual canvas.

Angular direction of the X and Y axes on the canvas can change for different virtual positions of the canvas or for different points of the at least one virtual Z-axis. It would reflect the possibility of creating a distorted three-dimensional virtual space, which can predetermine the desired distortion of the images within this space independently of the sequence of creating/painting those images.

The total three-dimensional scaling grid, although it is temporary and does not interfere with the painting, might be helpful during the entire process of painting and can be turned on and off any time. There are many different ways of visualization of selected virtual position of the canvas. For example, the selected position of the virtual canvas can be presented as a focal plane with the small depth of sharpness. It means that the images within this plane will be sharp while the images on the other planes in front and behind the selected plane will be presented as blurred. The depth of sharpness might be set up beforehand or controlled continuously in the process of painting by one of the control buttons/joysticks 22, as shown in FIG. 3.

In another example of the visualization of selected position of the virtual canvas this position can be presented as a semi-transparent plane, which is crossed by the Z-axes. The part of Z-axes between the plane and the painter will be seen sharp while the other part, being behind the semi-transparent plane, will be seen blurry. Therefore, the position of the virtual canvas will be visually defined on the system of Z-axes.

The method of digital three-dimensional hand-painting and three-dimensional hand-drawing and method of digital recording of painted images described above can also possess the following properties:

providing a description in digital format of images on each virtual position of the canvas and of corresponding positions of the canvas and providing complete three-dimensional digital image of the painting for different applications associated with three-dimensional image processing (like rotation, animation, etc.);

painting or drawing on the electronic canvas for each of the virtual positions of the canvas in the third dimension will result in simultaneous painting on two canvases switching between right and left eye with frequency high enough that hand-painted images would appear on both canvases with certain horizontal offsets with respect to a central vertical line for each canvas on a distance corresponding to chosen virtual position of the canvas;

providing a complete two-dimensional image of the painting for the right and the left eyes obtained by superposition of all layers corresponding to virtual positions of the canvas for the right and the left eye separately;

providing multiple virtual positions of electronic canvas along the axis between the painter and the canvas;

providing a property of electronic canvas to be transparent outside the painted area on the current virtual position of the canvas for all images on the next positions of the canvas located further from the painter;

providing a property of electronic canvas to mask by the painted area on the current virtual position of the canvas the images on the next positions of the canvas located further from the painter;

providing such a property of electronic canvas, wherein the opacity and transparency of the painted areas are controlled independently for any layer corresponding to a virtual position of electronic canvas;

providing a property of electronic canvas to be switched in turn for left and right eye with a certain frequency high enough that drawn lines and painted strokes are continuous for both right and left images;

providing the means for three-dimensional digital vision, which comprise the electronic canvas capable switching in turn for left and right eye with a certain frequency and shutter glasses switching synchronously with electronic canvas between left and right eye;

providing two or more at least two-axis input control devices allowing simultaneous digital painting or drawing on the canvas;

providing two or more at least two-axis input control devices allowing simultaneous digital painting or drawing on different virtual positions of the canvas;

switching electronic canvas between two or more at least two-axis input control devices, their corresponding additional at least one-axis input control devices and corresponding shutter glasses, which are switching synchronously with electronic canvas between these input control devices and for each input control device between left and right eye;

providing additional two or more at least one-axis input control devices, which are used for controlling functions of the digital painting process chosen from a group of: action, turning on and off, navigation of a cursor on the display of the electronic device, scrolling, zooming, shadowing, screening, selecting, deleting, restoring, saving, opening, closing, searching, setting up, previewing, undoing, clearing, repeating, pasting, finding, replacing, inserting, formatting, color selection, color mixing, line or stroke width, brush size, swatch size, sponge size, eraser size, special effects . . . or combination;

providing painting or drawing on the electronic canvas, which is happening simultaneously with changing the virtual positions of the canvas in the third dimension by changing this position with the at least one-axis input control device and verifying this position with the means for three-dimensional digital vision;

providing an additional input control determining the range of variations of the canvas virtual positions within the system of three-dimensional digital vision;

providing an additional input control determining the depth of the focal plane around the canvas virtual position within the system of three-dimensional digital vision;

providing presentation of the virtual position of the canvas as a focal plane with a small focal depth for the purpose of increasing accuracy of verification of virtual canvas position;

providing presentation of the virtual position of the canvas as a temporary grid corresponding to this virtual position of the canvas;

providing a grid in the plane of the canvas corresponding to the virtual position of the canvas within the system of three-dimensional digital vision, which has the pitch of the grid proportional to the distance from the painter to the virtual position of the canvas;

providing grid in the plane of the canvas, wherein pitch of the grid is proportional to the distance from the painter to the virtual position of the canvas and changing the virtual position of the canvas automatically changes the grid pitch;

providing such a way of presentation of the virtual position of the canvas, where it is presented by at least one virtual Z-axis having an origin somewhere in the plane parallel to the canvas and located at the location of a painter, this at least one virtual Z-axis is directed from the painter plane toward the canvas and having a scale describing a distance from the painter to the virtual position of the canvas and this virtual position of the canvas is indicated on this scale;

providing at least one virtual Z-axis, which is presented on the canvas as a line with the scale connecting some point on the periphery of the canvas with some inner point within the canvas;

providing at least one virtual Z-axis, which is presented by the line chosen from: straight line, curved line, periodic line, spiral line, vertical line, horizontal line, descending line, ascending line and combination;

providing such angular direction of the X and Y axes on the canvas, which can change for different virtual positions of the canvas or for different points of the at least one virtual Z-axis;

providing at least one virtual Z-axis, which can have an angle relative to the perpendicular to the canvas in the range of 0 to 90 degrees; providing a scale on the at least one virtual Z-axis, which is chosen from: linear, exponential, logarithmic, sine, or any other function;

providing two virtual Z-axes having an origin somewhere in the plane parallel to the canvas and located at the location of a painter, these two virtual Z-axes are directed from the painter plane toward the canvas and having scales describing a distance from the painter to the virtual position of the canvas and this virtual position of the canvas is indicated on these scales;

providing three virtual Z-axes having an origin somewhere in the plane parallel to the canvas and located at the location of a painter, these three virtual Z-axes are directed from the painter plane toward the canvas and having scales describing a distance from the painter to the virtual position of the canvas and this virtual position of the canvas is indicated on these scales;

providing four virtual Z-axes having an origin somewhere in the plane parallel to the canvas and located at the location of a painter, these four virtual Z-axes are directed from the painter plane toward the canvas and having scales describing a distance from the painter to the virtual position of the canvas and this virtual position of the canvas is indicated on these scales;

providing scales on different virtual Z-axes, which can be different reflecting the different angular position of the virtual canvas with respect to different virtual Z-axes;

providing a temporary grid visually defining the virtual position of the canvas, which is a system of lines including lines connecting points on different virtual Z-axes corresponding to the same position of the virtual canvas;

providing means for presentation of three-dimensional images, which are chosen from a group of: optical projection of two images with polarized light onto one screen and using polarized glasses, optical projection of two images with colored light onto one screen and using corresponding colored glasses, stereoscopic glasses and two photographs or slides, three-dimensional digital personal viewer, shutter glasses and synchronous switching display between left and right eye, direct projection of left and right images onto retina of the eyes.

associating each virtual position of the canvas with the corresponding zooming value of the image, which can be set up in different required ranges in such a way that equal size of an object on different virtual positions of the canvas would be zoomed out while virtual positions of the canvas will be moving from the painter and would be zoomed in while virtual positions of the canvas will be moving toward the painter;

associating a painted stroke or image with a certain virtual position of the canvas and later moving it to a different virtual position of the canvas, either with zooming or without zooming, and pasted on this new position of the canvas;

associating a painted three-dimensional image with certain range of virtual positions of the canvas and later moving it to a different range of virtual positions of the canvas, either with corresponding zooming or without zooming, and pasting on these new positions of the canvas.

The system for digital three-dimensional hand-painting and three-dimensional hand-drawing and system for digital recording of painted images described above can also comprise the following elements:

an electronic canvas, which is chosen from the group: computer monitor, TV screen, projection screen, display of the mobile device or any other graphical computer output device;

at least two-axis input control device allowing digital painting or drawing on the canvas, which is chosen from the group: sensitive pad, mouse, track ball, joystick, finger joystick, thimble, key-button, touch pad, touch screen, 6D motion sensor, smart pen, universal tool described below;

at least two-axis input control device allowing digital painting or drawing on the canvas, which is a three-axis input control device;

a three-axis input control device allowing digital painting or drawing on the canvas, which is a universal tool described below;

an additional at least one at least one-axis input control device for virtual changing the position of the canvas along the axis between the painter and the canvas, which is chosen from a group of: scroll wheel, sensitive pad, mouse, track ball, joystick, finger joystick, thimble, key-button, touch pad, touch screen, 6D motion sensor, smart pen, universal tool described below, and alike;

an additional at least one at least one-axis input control device for virtual changing the position of the canvas along the axis between the painter and the canvas, which can be either two-axis or three-axis input control device;

an additional at least one at least one-axis input control device for virtual changing the position of the canvas is integrated within one device with at least one of at least two-axis input control devices allowing digital painting or drawing on the canvas;

an additional input control determining the range of variations of the canvas virtual positions;

an additional input control determining the depth of the focal plane around the canvas virtual position;

means for presentation of three-dimensional images, which are chosen from a group of: optical projection of two images with polarized light onto one screen and using polarized glasses, optical projection of two images with colored light onto one screen and using corresponding colored glasses, stereoscopic glasses and two photographs or slides, three-dimensional digital personal viewer, shutter glasses and synchronous switching display between left and right eye, direct projection of left and right images onto retina of the eyes;

three-dimensional digital personal viewer, which comprises: two micro-displays for left and right eye, two lenses of the glasses for projecting the images from the displays into eyes, processor, memory, power supply, transceiver, body of the viewer integrating all the elements of the device.

Figure 11:
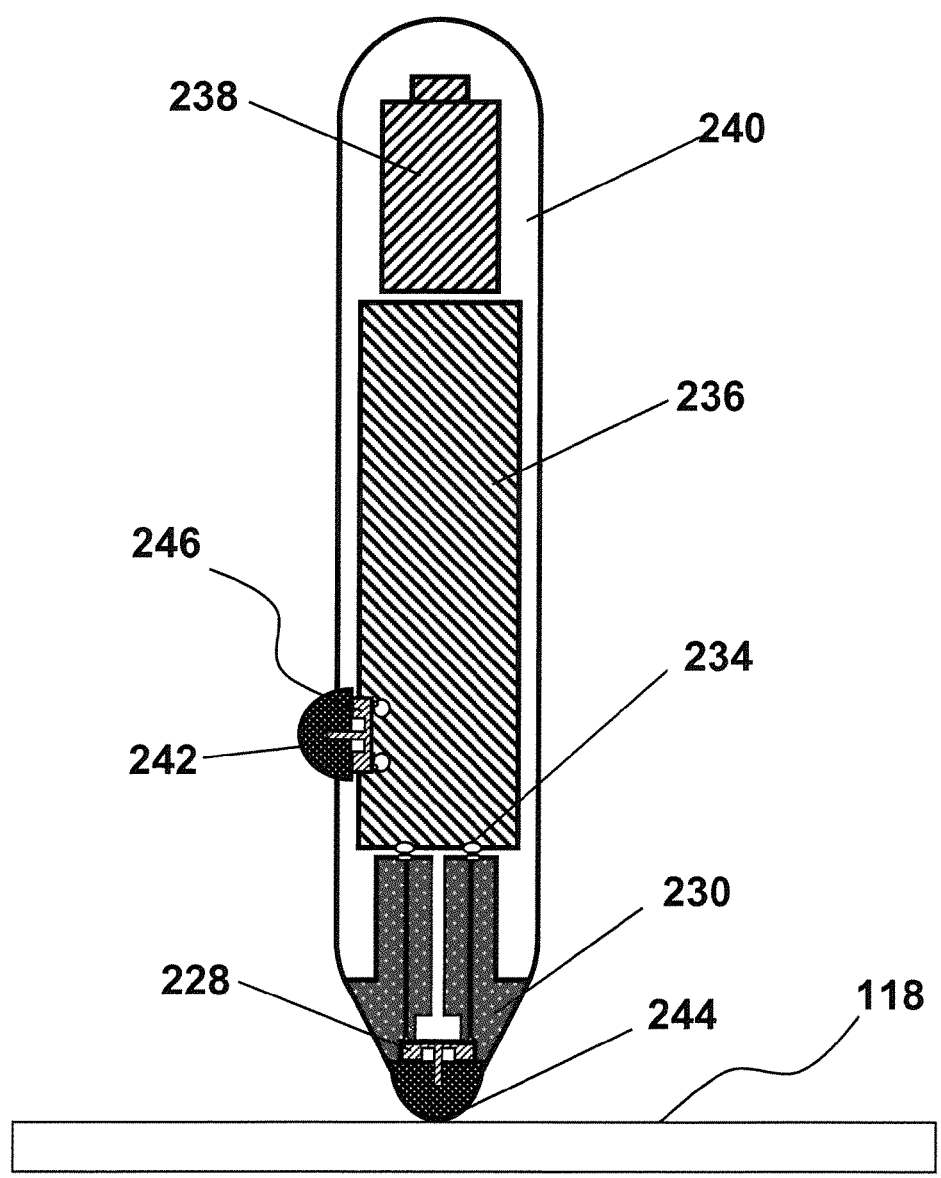
FIG. 11 shows a concept of an end-point digital brush and its major components.

FIG. 11 illustrates an example of an input control device allowing digital painting or drawing on the canvas. This device comprises several components. An end-point 244 is coupled to an integrated at least one at least two-axis force sensor 228 within the device; IC circuit for digitizing the information from at least one at least two-axis force sensor and processing the data related to the change of the force vector components. This circuit can be integrated on the same chip 228 with force sensor. It also can be located within the block 236 in the main body 240 of the device. The same block 236 can comprise hardware and software for providing a description in digital format of how the device has been pressed to the surface based at least in part on the force applied by the end-point to the writing surface. It also can comprise hardware and software for providing a description in digital format of how the device has been moved over the surface based at least in part on the correlation between the force vector components and corresponding movement vector components. End point 244 with force sensor 228 can be integrated within an interchangeable head 230, which is electrically connected by contacts 234 with the main processing block 236. The head 230 is the most delicate part of the device, as it has a direct mechanical contact with the painting surface and therefore, wear and tear of the end point would require periodic change. Making the head 230 interchangeable and having low cost and leaving the most expensive component within the main body 240 of the device allows reducing the total cost of ownership of this device. Block 236 can also comprise wireless communication circuits. Power supply 238 is also located in the device body 240. One or more additional control buttons 242 with their sensors 246 can be integrated in the device.

The device is moving with a hand and/or fingers such that the end-point 244 is contacting a surface 118 suitable for such movement across the surface in a process of painting, drawing, writing or cursor navigating while recording with the integrated at least one at least two-axis force sensor, the change of the vector force representing the motion of the device and force applied to the sensor by the end-point.

The painting device can further comprise at least one sensor chosen from the group of sensors consisting of: one-axis linear accelerometer, two-axis linear accelerometer, three-axis linear accelerometer, one-axis gyro, two-axis gyro, three-axis gyro, one-axis angular accelerometer, two-axis angular accelerometer, three-axis angular accelerometer, one-axis compass, two-axis compass, three-axis compass for determining the motion parameters, at which the device has been moved between recording of two positions on the working surface.

The end-point 244 can be chosen from the group: a pin [tip] coupled to the at least one at least one-axis force sensor, a ball contacting with the at least at least two-axis force sensor, a bunch of fibers coupled to the at least one at least two-axis force sensor.

Figure 12:
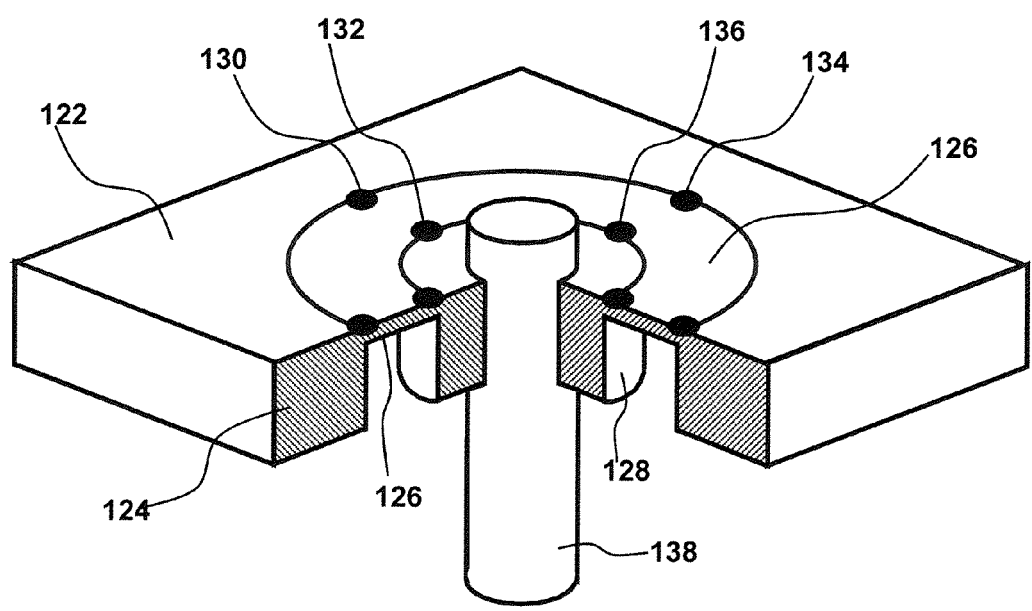
FIG. 12 shows a three-dimensional force sensor, which can be used in end-point digital brush.

FIG. 12 illustrates an example of a force sensor, which can be coupled to an end point of the painting device. It comprises a semiconductor substrate sensor chip 122, which, in its turn, comprises a frame element 124, a rigid island element 128 and an elastic element 126 mechanically coupling said frame and said rigid island elements 128. A set of two or more stress-sensitive IC components 130, 132, 134, 136 are integrated into the elastic element 126. At least one force-transferring element 138 couples the end-point 244 to a rigid island element 128 of a sensor die 122 for transferring the applied external vector force from the end-point through the force-transferring element 138 to the rigid island element 128 of the sensor die 122, and thereby generating electrical outputs from application the external force vector via stress-sensitive IC components 130-136 positioned in the elastic element 126 each carrying the unique orthogonal system component of signal from the force vector, where the IC component outputs are functions of input component stresses developed from the orthogonal system force components.

In general, at least two-axis force sensor is chosen from a group: mechanical force sensor, linear acceleration force sensor, angular acceleration force sensor, Coriolis force or angular rate force sensor and combination.

Figure 13:
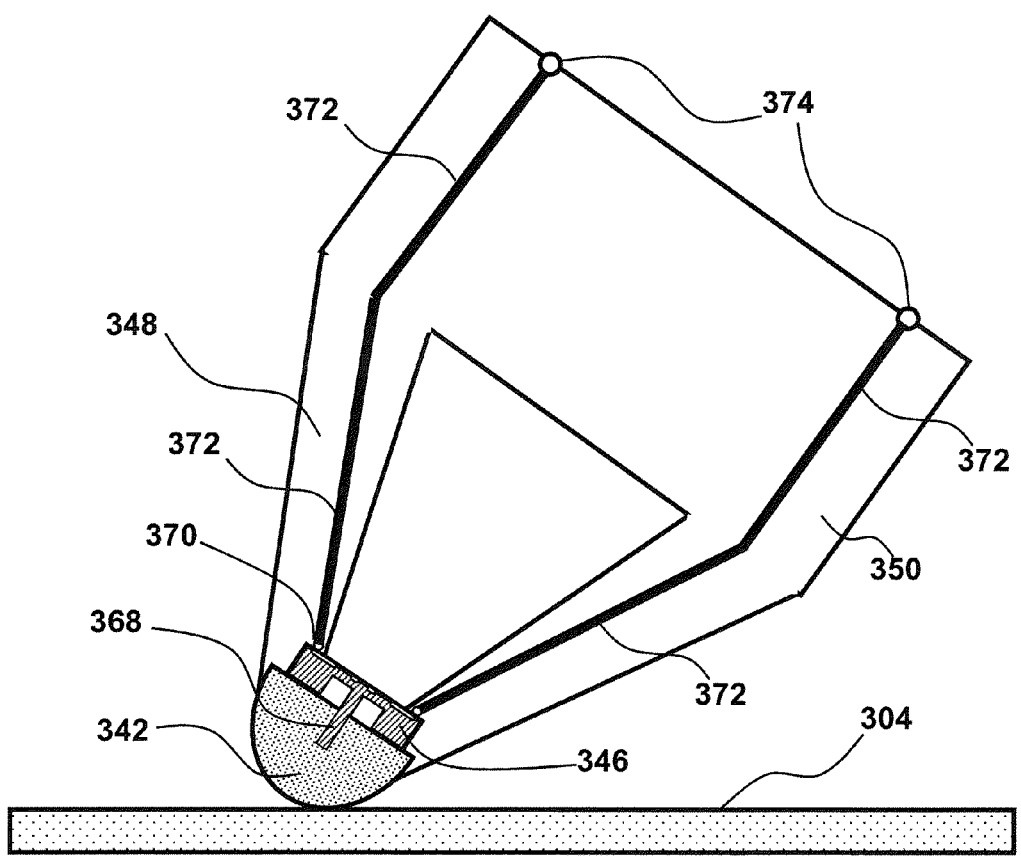
FIG. 13 illustrates the three-dimensional force sensor within an end-point of an interchangeable cartridge of the digital brush.

FIG. 13 illustrates an example of the interchangeable head 350 of the painting tool. The head comprises an end-point 342 fixed in the conical part 348 of the body of the head 350. The force sensor die 346 is attached to the end-point by the force-transferring element 368. The contact pads 370 of the die 346 are electrically connected by the wires 372 with the external electrical contacts 374, which provide electrical connection of the force sensor with the main processing electronic circuit located within non-interchangeable part of the painting tool.

The method described above can be used for a method of converting two-dimensional images into digital three-dimensional images, said method comprising:

provmg an electronic canvas (computer monitor, TV screen, projection screen, etc.);

providing a digitized two-dimensional image (picture, photo, drawing, etc.)

providing means for three-dimensional digital vision (shutter glasses, splitting canvas on two canvases and switching these canvases between left and right eye, etc.);

providing at least one at least two-axis input control device allowing selecting images and digital painting or drawing on the canvas;

providing additional at least one at least one-axis input control device for virtual changing the position of the canvas along the axis between the painter and the canvas;

selecting certain areas on the digital two-dimensional image, which are supposedly closer to the viewer than the background of the image;

providing a description in digital format of selected areas;

selecting virtual position of the canvas, which supposedly corresponds to the spatial position of the selected areas in the third dimension between the viewer and the background;

pasting the selected areas onto the selected virtual position of the canvas, which will result in splitting the selected areas on two copies for the right eye and the left eye and shifting (offsetting) these two copies horizontally in opposite directions with respect to a central vertical line for each canvas on a distance corresponding to the chosen virtual position of the canvas;

selecting next areas on the image, which are supposedly closer to the viewer than the previously selected and shifted areas of the image;

providing a description in digital format of selected areas;

selecting next virtual position of the canvas, which supposedly corresponds to the spatial position of the selected next areas in the third dimension closer to the viewer;

pasting the selected next areas onto the selected next virtual position of the canvas, which will result in shifting these next areas horizontally in opposite directions with respect to a central vertical line for each canvas on a distance corresponding to the chosen next virtual position of the canvas;

selecting next areas on the image and pasting them on the virtual canvases closer and closer to the viewer as many times as needed until closest to the viewer areas would not be selected and pasted;

providing a description in a digital format of composed right and left images;

using left and right images for presentation of corresponding three-dimensional images by available means for three-dimensional vision.

The sequence of selecting and pasting areas from the image can be realized in an opposite order, namely from the foreground toward the background or in arbitrary order.

The areas between the two overlapping consecutively selected areas are gradually shifted horizontally such that pixels closer to the border of the first selected area are shifted to the same distance as the first area and that pixels closer to the border of the second selected area are shifted to the same distance as the second area while all the other pixels between the first and the second areas along the horizontal axis are shifted on different distances according to the predetermined law of the gradient of shift between the first and the second areas.

The gaps, which appeared between the two consecutively selected and shifted on different distance areas, can be filled in manually with at least one at least two-axis input control device allowing digital painting or drawing or selecting and stamping on the electronic canvas.

Obviously, the method of three-dimensional painting can be used for editing, enhancing, filtering and modifying three-dimensional photo images (three-dimensional photoshop), said method comprising:

providing a three-dimensional photo image;

providing an electronic canvas (computer monitor, TV screen, projection screen, display of the mobile device, etc.);

providing means for three-dimensional digital vision (shutter glasses, splitting canvas on two canvases and switching these canvases between left and right eye, etc.);

providing at least one at least two-axis input control device allowing digital painting, drawing or selection areas on the canvas;

providing additional at least one at least one-axis input control device for virtual changing the position of the canvas along the axis between the painter and the canvas;

choosing the virtual position of the canvas corresponding to the areas on the three-dimensional photo image, which is supposed to be edited, enhanced, filtered or modified;

painting, drawing, editing, enhancing, filtering or modifying selected areas on the electronic canvas for each of the virtual positions of the canvas in the third dimension by changing this position with the at least one-axis input control device and verifying this position with the means for three-dimensional digital vision;

providing a description in digital format of images for right and left eyes on each virtual position of the canvas and of corresponding positions of the canvas;

providing complete modified and edited two-dimensional images of the three-dimensional photo image for the right and the left eyes;

using left and right images for presentation of edited three-dimensional photo image by available means for three-dimensional vision.

Figure 14:
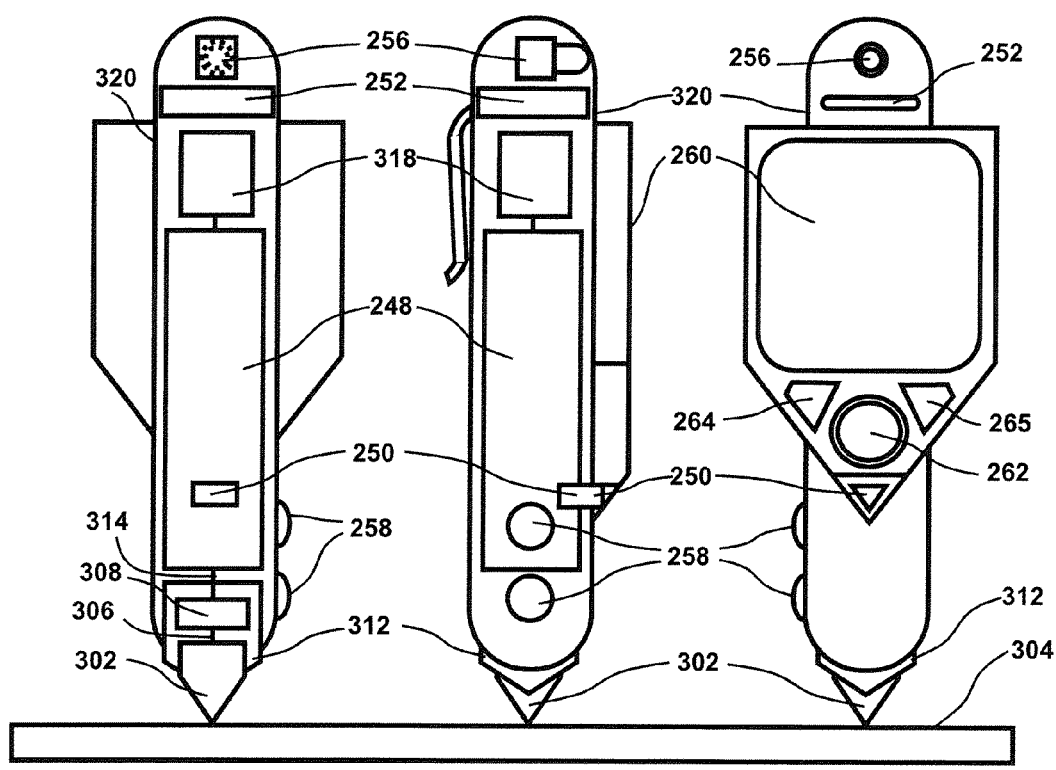
FIG. 14 shows a concept of a smart phone combining a digital brush and pen as a universal input control device, as pointing/navigating, hand-written text messaging and drawing messaging.
Figure 15:
FIG. 15 shows a picture of a new concept of a smart phone with digital brush and pen.

FIGS. 14 and 15 illustrate an example of a universal tool, which can be used for multiple applications. It can be used as a painting or drawing tool, as a pen or pencil for writing, as a mouse or joystick for navigation on the screen or computer or mobile gaming. It can have a wireless capability and can be combined with cell-phone capabilities with all the attributes, which smart phone has: display, camera, microphone, speakerphone, control buttons, etc.

As follows from FIG. 14, which depicts the front, side and back projections of the device, it has an end-point 302 coupled to the multi-axis force sensor 308 within an interchangeable cartridge 312. The tool has an electronic block 248, which comprises digital processor, wireless communication circuits, additional sensors, etc. For example, microphone 250 can be part of the block 248. Inside the body 320 of the device a power supply 318, speakerphone 252 and photo-camera 256 can also be located. A part of the body 320 is a display 260. A number of control buttons 258, 262, 264, 265 can be situated in convenient locations on the body 320 of the tool. Different functions, as described above, can be assigned to these control buttons. Each of these buttons can be multi-axis micro joysticks significantly increasing the total number of functions under control.

It should be understood that the microstructures of the die, structures of the finger-mice, finger buttons and micro-joysticks and methods of their fabrication do not limit the present invention, but only illustrate some of the various technical solutions covered by this invention. While the invention has been described in detail with reference to preferred embodiments, it is understood that variations and modifications thereof may be made without departing from the true spirit and scope of the invention.

Figure 16:
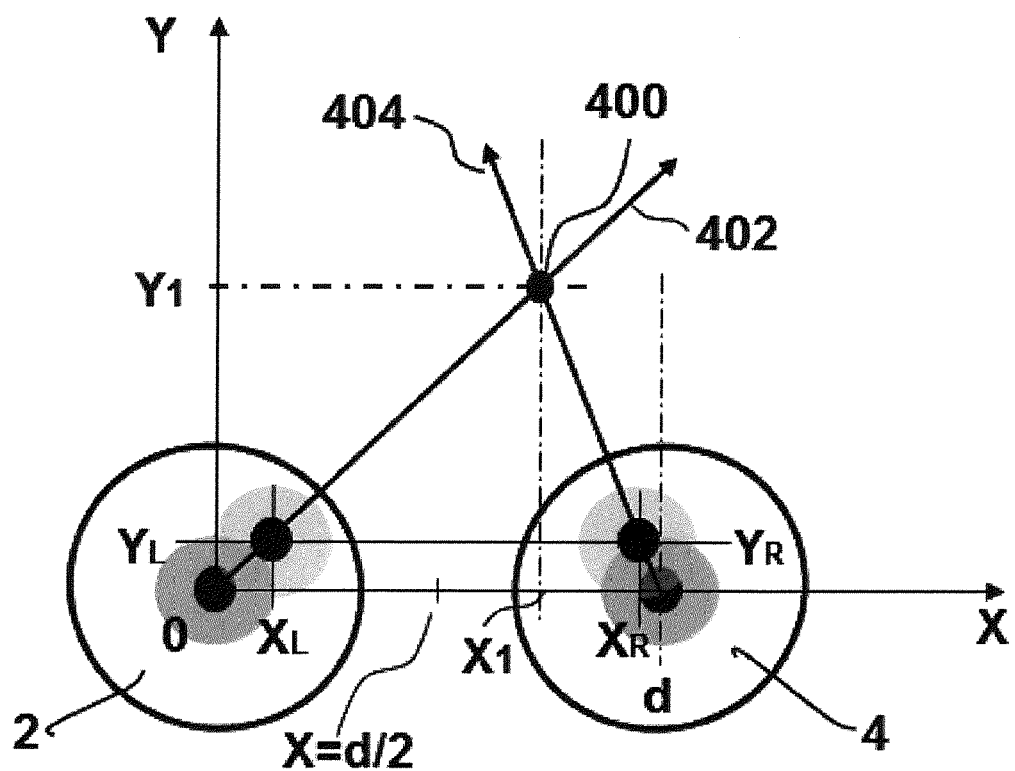
FIG. 16 illustrates how coordinates of point of view focus on XY plane parallel to the canvas can be measured and calculated.
Figure 17:
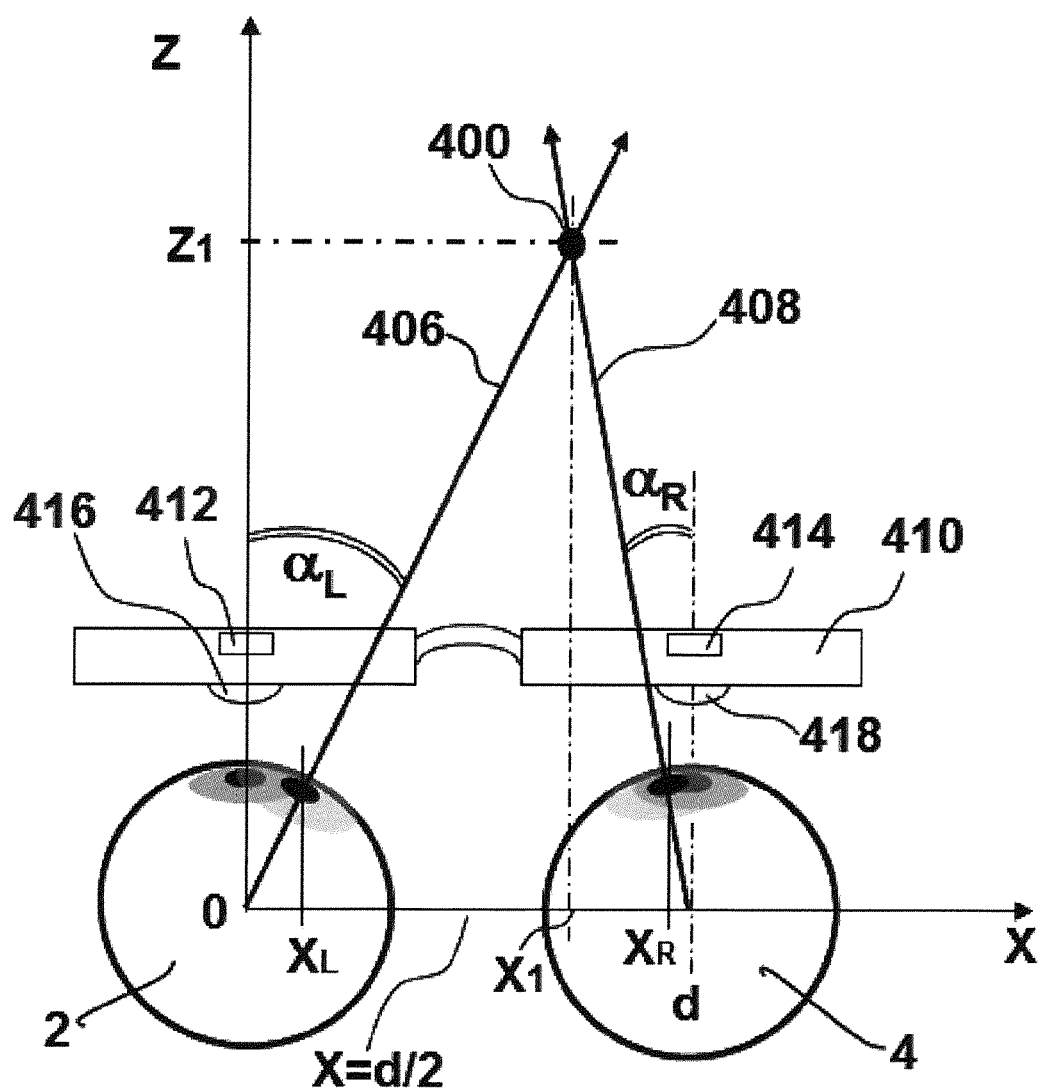
FIG. 17 illustrates how a coordinate Z (a depth in three-dimensional virtual space) of point of focus on XZ plane can be calculated.

FIGS. 16 and 17 illustrate an example of how painting or drawing can be done based on the moving of other than hand and finger parts of the human body. In particular, human eyes can be used for this purpose. One eye can be used for painting or drawing on the two-dimensional plane, while both eyes provide capability of realizing painting or drawing in virtual three-dimensional space. It can be used for multiple applications. It can be used for handless painting, drawing or writing, as a mouse or joystick for navigation on the screen of a computer or mobile gaming. It can be used for communication with paralyzed patients, for rehabilitation and education. It can be used as an additional communication channel in parallel with verbal/hearing and manual/tactile channels.

FIG. 16 illustrates schematically two eyeballs 2 and 4 on the XY plane. An initial center of the pupil of the left eye is located in the origin of XY plane and an initial center of the pupil of the right eye is located on a distance d from the origin on axis X. If a human being is looking at the point of view 400 at the XY plane then his/her eyeballs rotate and the pupils of both eyes would have new position on the XY plane. The left pupil will have new coordinates: $X=X_L$ and $Y=Y_L$ and the right pupil will be at: $X=X_R$ and $Y=Y_R$. These coordinates determine the direction 402 of the left eyeball toward the point of focus 400 and the direction 404 of the right eyeball toward the point of focus 400. It is self-explanatory that if one can measure coordinates $X_L$, $Y_L$ and $X_R$, $Y_R$ then the coordinates $X_1$, $Y_1$ of the point of focus will be also known. Therefore, measuring the instant position of the eye pupils with respect to their initial position and change of their position allows determining the instant point of focus and trajectory of this point on XY plane, as a result of eye movement.

FIG. 17 illustrates schematically how with the measurements described above the depth of vision or the third coordinate on the axis Z perpendicular to the XY plane can also be determined. Two eyeballs 2 and 4 are shown here on the XZ plane. The glasses 410 for stereoscopic vision are also shown in the picture. These glasses comprise two photo-sensor arrays 412 and 414 for the left and right eyes correspondingly. The images of the eye and the pupil are projected to the photo-sensor arrays through the optical systems 416 and 418. These photo-sensor arrays allow making measurements of initial pupils' position and their instant positions relative to initial positions described above. When coordinates $X_L$ and $X_R$ are measured, then knowing the geometry of the eyeball, it is easy to determine an angular direction 406 $\alpha_L$ and angular direction 408 $\alpha_R$ toward projection of point of focus 400 on XZ plane. It gives the $Z_1$ coordinate of the point of focus on XZ plane. As a result of these measurements and calculations, all three coordinates $X_1$, $Y_1$ and $Z_1$ of instant position of point of focus within three-dimensional virtual space are determined. Moving the instant point of focus by moving both eyeballs allows anyone to make a three-dimensional trajectory of this movement, e.g., making handless painting or drawing possible.

Therefore, while the invention has been described with respect to a limited number of the embodiments, those skilled in the art, having benefits of this invention, will appreciate that other embodiments can be devised which do not depart from the scope of the invention as disclosed herein. Other aspects of the invention will be apparent from the following description and the appended claims.

What is claimed is:

1. A method of digital continuous and simultaneous three-dimensional painting and three-dimensional drawing, said method comprising:

providing a digital electronic canvas having a screen and capable of presenting two pictures for a right eye and a left eye;

providing means for continuous changing of a virtual distance between the digital electronic canvas and a painter by digitally changing a horizontal shifting between images for the right eye and the left eye on the digital electronic canvas corresponding to instant virtual canvas position;

wherein a resolution Δ of continuity of changing of the virtual distance Z between the digital electronic canvas and the painter is defined by a size p of a pixel on the digital electronic canvas in horizontal direction and by a distance d between pupils of a painter's eyes according to an expression: $\Delta \approx 2p\, Z/d$;

providing at least one three-axis input control device allowing digital painting or drawing on the digital electronic canvas;

painting on the digital electronic canvas for any instant virtual positions of the digital electronic canvas providing simultaneous appearance of a similar stroke on the images for the right and the left eye, wherein a simultaneousness of appearance of said similar stroke on the images for the right and the left eye is limited by a smallest time interval equal to an inverted frequency of refreshment of frames on the digital electronic canvas and wherein a motion for making simultaneous and continuous strokes or lines in all three dimensions is provided simultaneously and continuously by free moving at least one part of a painter body.

2. A method according to claim 1, wherein free motion of at least one part of the painter body for making said simultaneous and continuous strokes or lines in all three-dimensions is detected by a system of sensors providing an input information about free motion into input control device for said digital painting or drawing on the digital electronic canvas.

3. A method according to claim 1, wherein an input control device for said digital painting or drawing on the digital electronic canvas is attached to or grabbed by at least one part of the painter body.

4. A method according to claim 2, wherein the system of sensors providing said input information about said free motion into said input control device for said digital painting or drawing on the digital electronic canvas comprises at least one sensor, which is remotely measuring the motion of at least one part of the painter body in at least one dimension.

5. A method according to claim 1, wherein the free moving at least one part of the painter body for making said simultaneous and continuous strokes or lines in all three-dimensions includes any part of a body that the painter can move.

6. A method according to claim 4, wherein the system of sensors providing said input information about said free motion into said input control device for said digital painting or drawing on the digital electronic canvas comprises at least two photo-sensor arrays configured to determine the change in position of pupils of both eyes of the painter and calculate a point of instant painter eyes focus in three-dimensional virtual space and determine a trajectory of motion of the point of instant painter eyes focus within said three-dimensional virtual space.

7. A method according to claim 6 further comprising a step of individual calibration of at least two photo-sensor arrays for increasing an accuracy of determining coordinates of a painter's eyes focus within three-dimensional virtual space.

8. A method according to claim 7, wherein the step of individual calibration of at least two photo-sensor arrays includes:
  putting on three-dimensional glasses with coupled photo-sensor arrays for each eye of the painter;
  offering a series of three-dimensional images with predetermined positions of painter eyes focus within three-dimensional virtual space;
  measuring positions of the pupils of both eyes for each position of painter's eyes focus within three-dimensional virtual space;
  calculating an individual correlation between the position of the painter's eyes focus within three-dimensional virtual space and positions of both pupils on fields of photo-sensor arrays;
  using said individual correlation for solving reverse task of calculating coordinates of the painter's eyes focus within three-dimensional virtual space based on the positions of both pupils on the fields of photo-sensor arrays.

9. A method according to claim 6, wherein the at least two photo-sensor arrays configured to determine blinking or winking for coding action commands in a process of handless painting.

10. A method according to claim 1 further comprising multiple three-axis input control devices connected into a network of multiple users collectively and simultaneously participating in three-dimensional painting, drawing, gaming, studying, brain-storming, and researching, wherein working with three-dimensional imaging is required.

11. A system for digital continuous and simultaneous three-dimensional painting and three-dimensional drawing and digital recording of three-dimensional painted and three-dimensional drawn images, said system comprising:
  a digital electronic canvas having a screen and capable to present two pictures for a right eye and a left eye;
  means for three-dimensional digital vision comprising shutter glasses or polaroid glasses for splitting canvas on two canvases for the right eye and the left eye and switching the two canvases between the right eye and the left eye, projecting both pictures for the right eye and the left eye on the digital electronic canvas, or projecting pictures for the right eye and the left eye directly into retinas of corresponding eyes, wherein instant positions of virtual canvas in three-dimensional virtual space are displayed on the means for three-dimensional digital vision;
  at least one three-axis input control device for digital painting or drawing on the digital electronic canvas;
  means for three-dimensional image presentation comprising a processor;
  wherein two inputs of at least one three-axis input control device are used by the means for three-dimensional image presentation for painting of lines or strokes along two orthogonal axes X and Y in a plane of the digital electronic canvas and a third input is used by the means for three-dimensional image presentation for painting or drawing the lines or strokes along Z axis between a painter and the digital electronic canvas by changing a distance between the painter and a virtual position of the digital electronic canvas along the Z axis, making three-dimensional paintings or drawings equally continuous in (XY) plane and (XZ) and (YZ) virtual planes; and
  wherein a motion captured by the at least one three-axis input control device is used by the means for three-dimensional image presentation for making lines or strokes, and the motion is provided simultaneously and continuously in all three dimensions by movements of at least one part of a painter body; and
  wherein the means for three-dimensional image presentation provides a description in digital format of images for the right eye and the left eye for every and all instant virtual positions of the digital electronic canvas and of corresponding positions of the digital electronic canvas;
  wherein the means for three-dimensional image presentation provides complete two-dimensional images of a painting for the right eye and the left eye at any stage of painting as accumulation of all lines and strokes made up to that stage; and
  wherein the means for three-dimensional image presentation provides complete three-dimensional images of the painting by superposition of all layers corresponding to all virtual positions of the digital electronic canvas and the means for three-dimensional image presentation provides two-dimensional left and right images to the means for three-dimensional digital vision for presentation of three-dimensional painting.

12. A system according to claim 11, wherein the at least one three-axis input control device comprises two input control devices: one two-axis input control device and one one-input control device.

13. A system according to claim 12, wherein the one two-axis input control device for painting or drawing is used by movements of hand and/or fingers in XY plane parallel to the plane of the screen, and the one-input control device for continuous changing the instant position of the virtual canvas along the Z-axis is used by movements of at least one eyeball of the painter.

14. A system according to claim 12, wherein the digital electronic canvas has a multi-touch screen, which has an area used as the one two-axis input control device for painting or drawing by finger or stylus in XY plane parallel to the plane of the screen, and which has another area of the screen used as one-input control device for continuous changing the instant position of the virtual canvas along the Z-axis.

15. A system according to claim 11, wherein said means for three-dimensional image presentation is configured to:
provide optical projection of two images with polarized light onto one screen and the two images are viewed by using polarized glasses, or
provide optical projection of two images with colored light onto one screen and the two images are viewed by using (i) corresponding colored glasses, or
provide shutter glasses and synchronous switching display between left and right eye, or
provide polaroid glasses and switching display between left and right eye polarized images, or
function as a three-dimensional monitor with a system of vertical cylindrical lenses and corresponding striped overlapping images for the right eye and the left eye for viewing stereoscopic images without any glasses, or
provide headsets or eyeglasses, which directly project left and right images onto the retina of the eyes.

16. A system according to claim 11, wherein the at least one three-axis input control device comprises a system of sensors providing an input information about movements of the at least one part of the painter body into input control device for said digital painting or drawing on the digital electronic canvas.

17. A system according to claim 16, wherein the system of sensors providing said input information about movements of the at least one part of the painter body into said input control device comprises at least one sensor remotely determining the motion of the at least one part of the painter body in at least one dimension.

18. A system according to claim 17, wherein the system of sensors providing said input information about movements of the at least one part of the painter body comprises at least two photo-sensor arrays configured to determine the change in position of pupils of both eyes of the painter, configured to calculate a point of instant painter's eyes focus in three-dimensional virtual space, and configured to determine a trajectory of motion of the point of instant painter's eyes focus in three-dimensional virtual space.

19. A system according to claim 18, wherein the at least two photo-sensor arrays coupled to a frame of glasses are used as said means for three-dimensional digital vision, and wherein the at least two photo-sensor arrays comprise an optical lens system for projecting an images of a painter's eyes onto corresponding photo-sensor arrays.

20. A system according to claim 11 further comprising multiple three-axis input control devices, computers and digital electronic canvases connected into a network of multiple users collectively and simultaneously participating in three-dimensional painting, drawing, gaming, studying, brain-storming, or researching, wherein working with three-dimensional imaging is required.

* * * * *